US012601128B2

(12) United States Patent
Martinez

(10) Patent No.: US 12,601,128 B2
(45) Date of Patent: Apr. 14, 2026

(54) STREET CURB CLEANING SYSTEM

(71) Applicant: Carlos Martinez, Corpus Christi, TX (US)

(72) Inventor: Carlos Martinez, Corpus Christi, TX (US)

( * ) Notice: Subject to any disclaimer, the term of this patent is extended or adjusted under 35 U.S.C. 154(b) by 421 days.

(21) Appl. No.: 18/134,236

(22) Filed: Apr. 13, 2023

(65) Prior Publication Data

US 2024/0344285 A1 Oct. 17, 2024

(51) Int. Cl.
*E01H 1/00* (2006.01)
*B65F 3/00* (2006.01)

(52) U.S. Cl.
CPC *E01H 1/00* (2013.01); *B65F 3/00* (2013.01)

(58) Field of Classification Search
CPC .................................... E01H 1/00; B65F 3/00
See application file for complete search history.

(56) References Cited

U.S. PATENT DOCUMENTS 2,101,769 A 12/1937 Westmoreland
2,684,496 A 7/1954 Lull
2,863,233 A * 12/1958 Johnson .................. E02F 5/022 414/724
2,959,305 A * 11/1960 Konefes .................. E02F 3/401 37/445
2,986,293 A * 5/1961 Konefes .................. E02F 3/401 414/726
3,734,318 A * 5/1973 Kraus ....................... B65F 3/00 198/511
3,927,780 A * 12/1975 Dearlove .................. B65F 3/18 198/308.1
4,051,961 A * 10/1977 Williams .................. B60P 1/36 198/301
5,018,587 A 5/1991 Gandrud
5,054,150 A 10/1991 Best
5,339,613 A * 8/1994 Wymore ................... B65F 3/00 56/344
6,088,865 A 7/2000 Truan
8,015,734 B1 * 9/2011 Mills ......................... E02F 3/40 37/444
9,015,970 B1 * 4/2015 Doucette ................. E02F 3/404 37/444
11,828,030 B2 * 11/2023 Burney ................. B02C 21/026
2004/0140110 A1 * 7/2004 Raup ..................... E02F 3/8152 172/817

FOREIGN PATENT DOCUMENTS

FR 2743828 A1 * 7/1997 ............. A01B 73/00

* cited by examiner

*Primary Examiner* — Matthew R Buck

(57) ABSTRACT

A street curb cleaning system for facilitating collecting trash from a street curb includes a tractor. A housing encloses a chamber space and includes a bottom wall, a back wall, a side wall, and a top wall. The bottom wall, the side wall, and the top wall form a front edge of the housing, wherein the front edge defines an opening into the chamber space. A mount attaches the housing to the tractor. A bottom wedge extends outwardly from a bottom section of the front edge. The bottom wedge separates trash from the street surface when the tractor moves the bottom wedge forward adjacently to the street surface. A side wedge extends outwardly from a side section of the front edge. The side wedge separates trash from a curb surface when the tractor moves the curb surface forward adjacently to the curb surface.

3 Claims, 6 Drawing Sheets

STREET CURB CLEANING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trash collectors and more particularly pertains to a new trash collector for facilitating collecting trash from a street curb by attaching to a moving vehicle and collecting trash as the vehicle moves in a forward direction.

(2) Description of Related Art Including Information Disclosed Under 37 CFR 1.97 and 1.98

The prior art relates to trash collectors and includes a variety of trash collectors being mounted to a vehicle. Known prior art does not include a trash collector being mounted to a tractor to facilitate collecting trash from a street curb.

BRIEF SUMMARY OF THE INVENTION

An embodiment of the disclosure meets the needs presented above by generally comprising a tractor. A housing encloses a chamber space and includes a bottom wall, a back wall, a side wall, and a top wall. The bottom wall, the side wall, and the top wall form a front edge of the housing, wherein the front edge defines an opening into the chamber space. A mount is coupled to the housing and removably mounts the housing to the tractor. A bottom wedge extends outwardly from a bottom section of the front edge. The bottom wedge is configured to separate trash from the street surface when the tractor moves the bottom wedge forward adjacently to the street surface, wherein the bottom wedge is configured to ramp trash up through the opening into the chamber space. A side wedge extends outwardly from a side section of the front edge. The side wedge is configured to separate trash from a curb surface when the tractor moves the curb surface forward adjacently to the curb surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
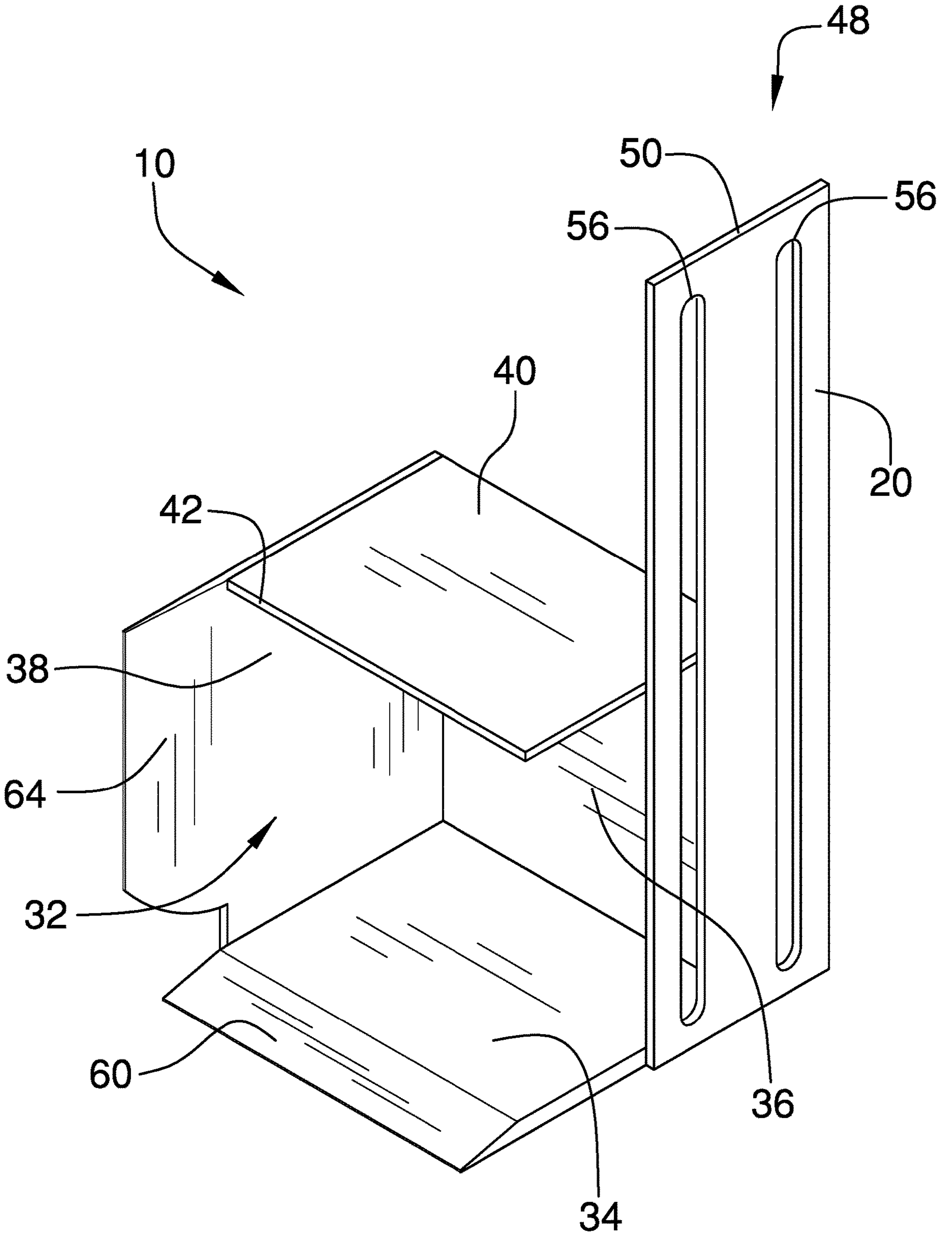
FIG. 1 is a top isometric view of a street curb cleaning system according to an embodiment of the disclosure.
Figure 2:
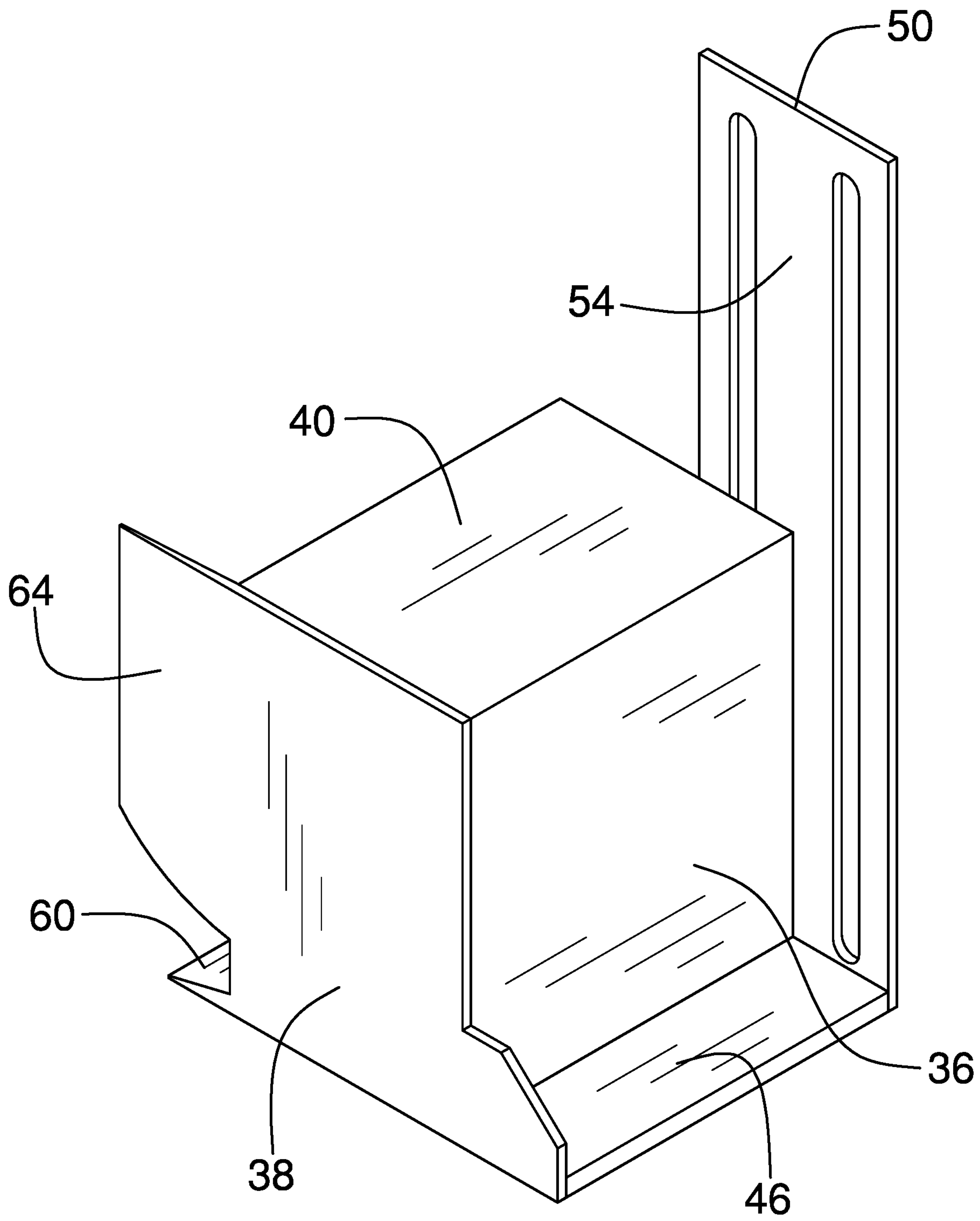
FIG. 2 is a rear isometric view of an embodiment of the disclosure.
Figure 4:
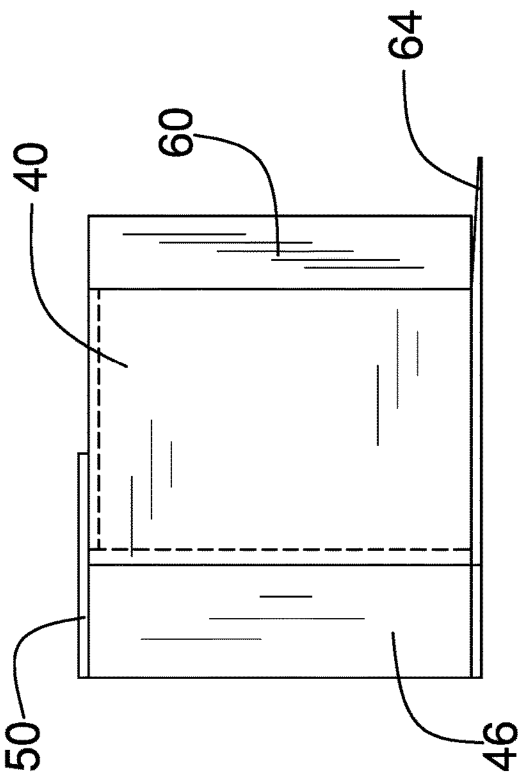
FIG. 4 is a top view of an embodiment of the disclosure.
Figure 5:
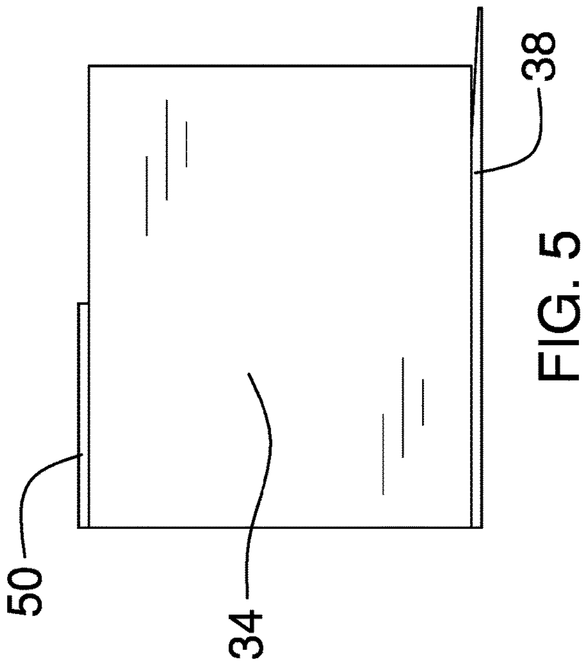
FIG. 5 is a bottom view of an embodiment of the disclosure.
Figure 3:
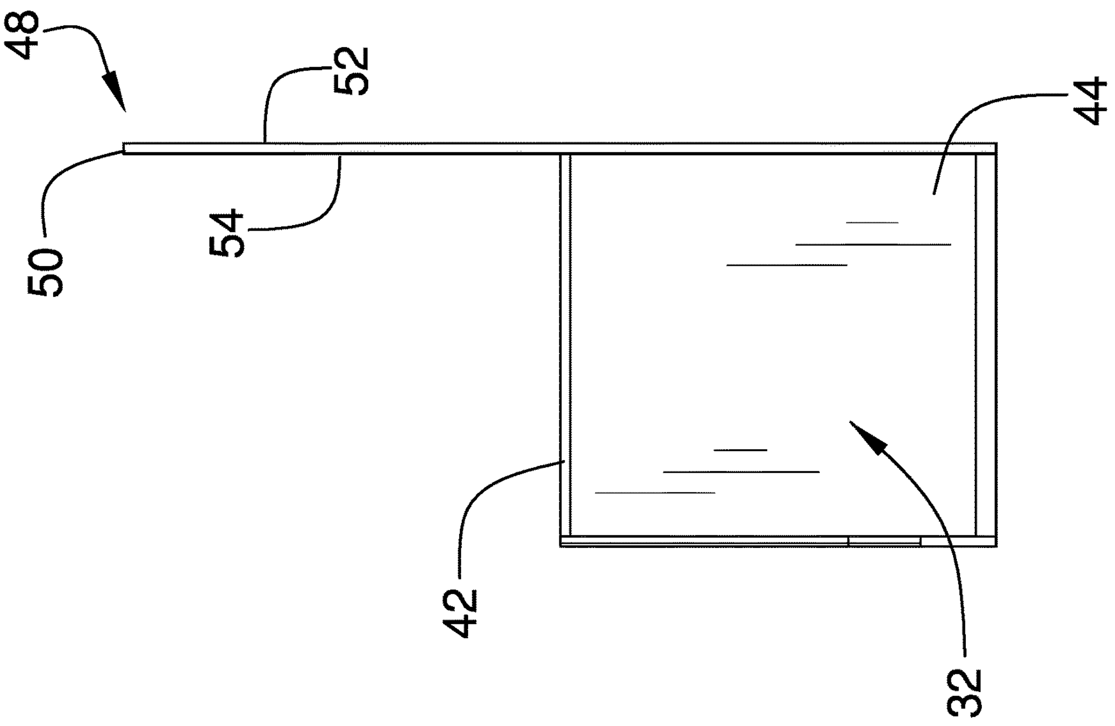
FIG. 3 is a front view of an embodiment of the disclosure.
Figure 7:
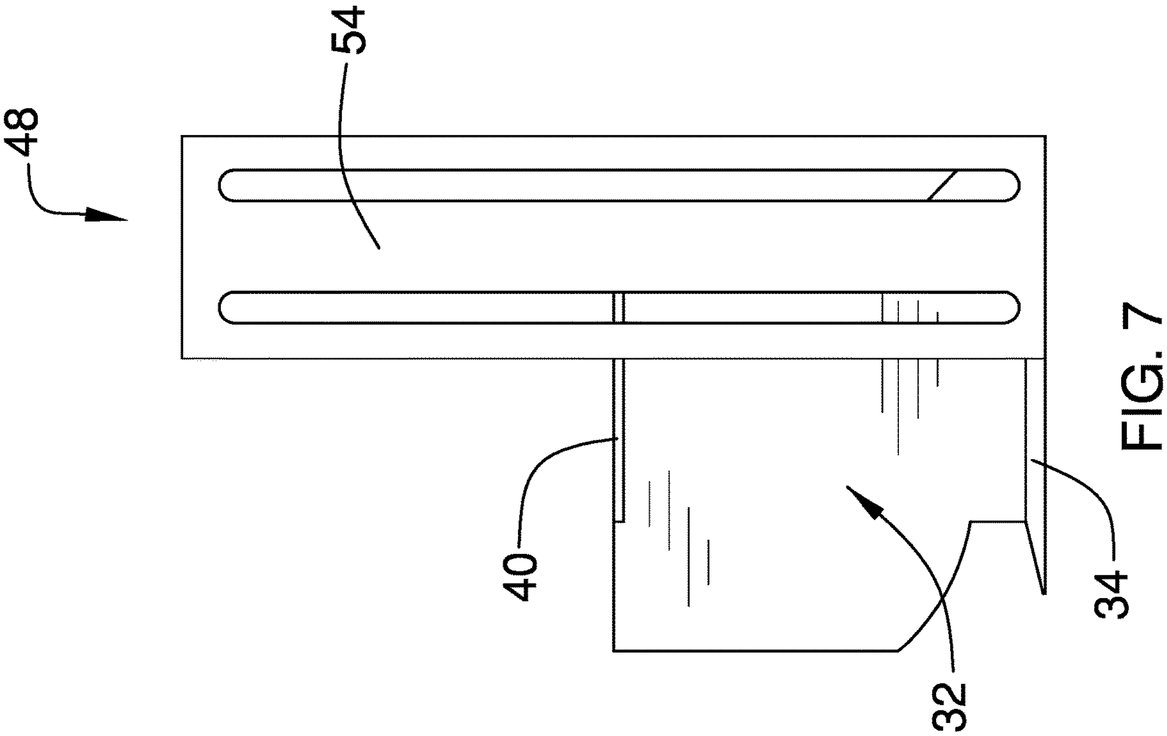
FIG. 7 is a right-side view of an embodiment of the disclosure.
Figure 6:
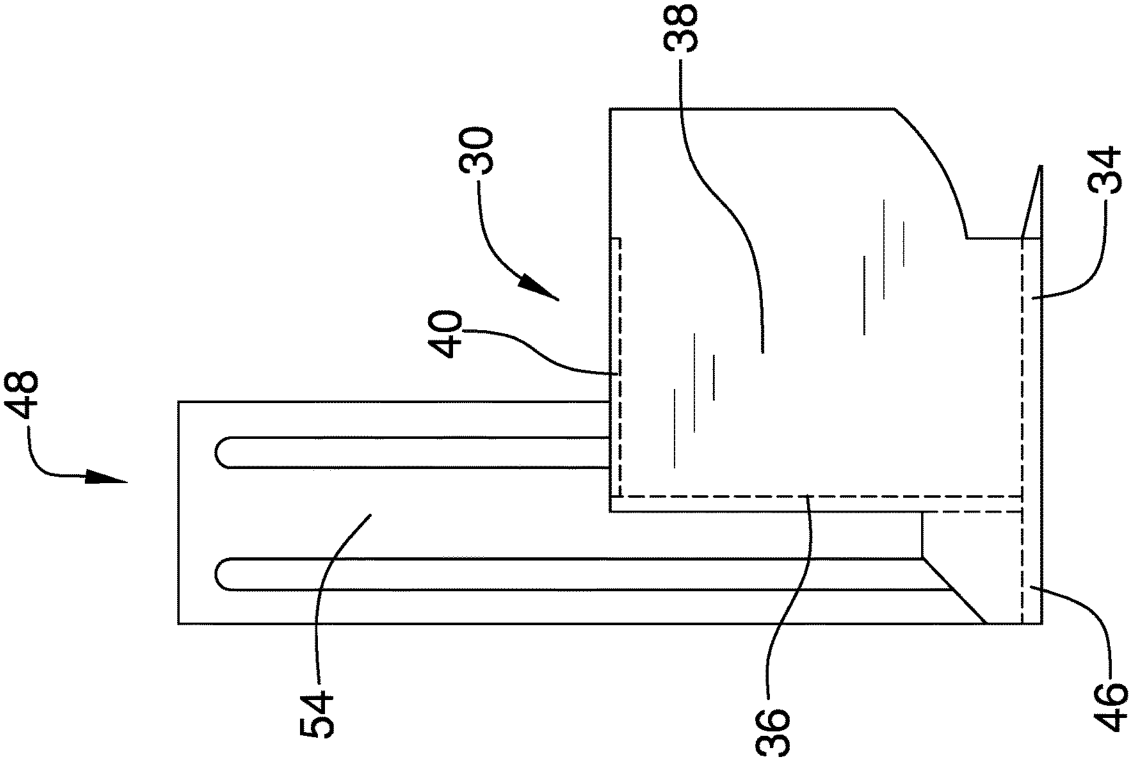
FIG. 6 is a left-side view of an embodiment of the disclosure.
Figure 8:
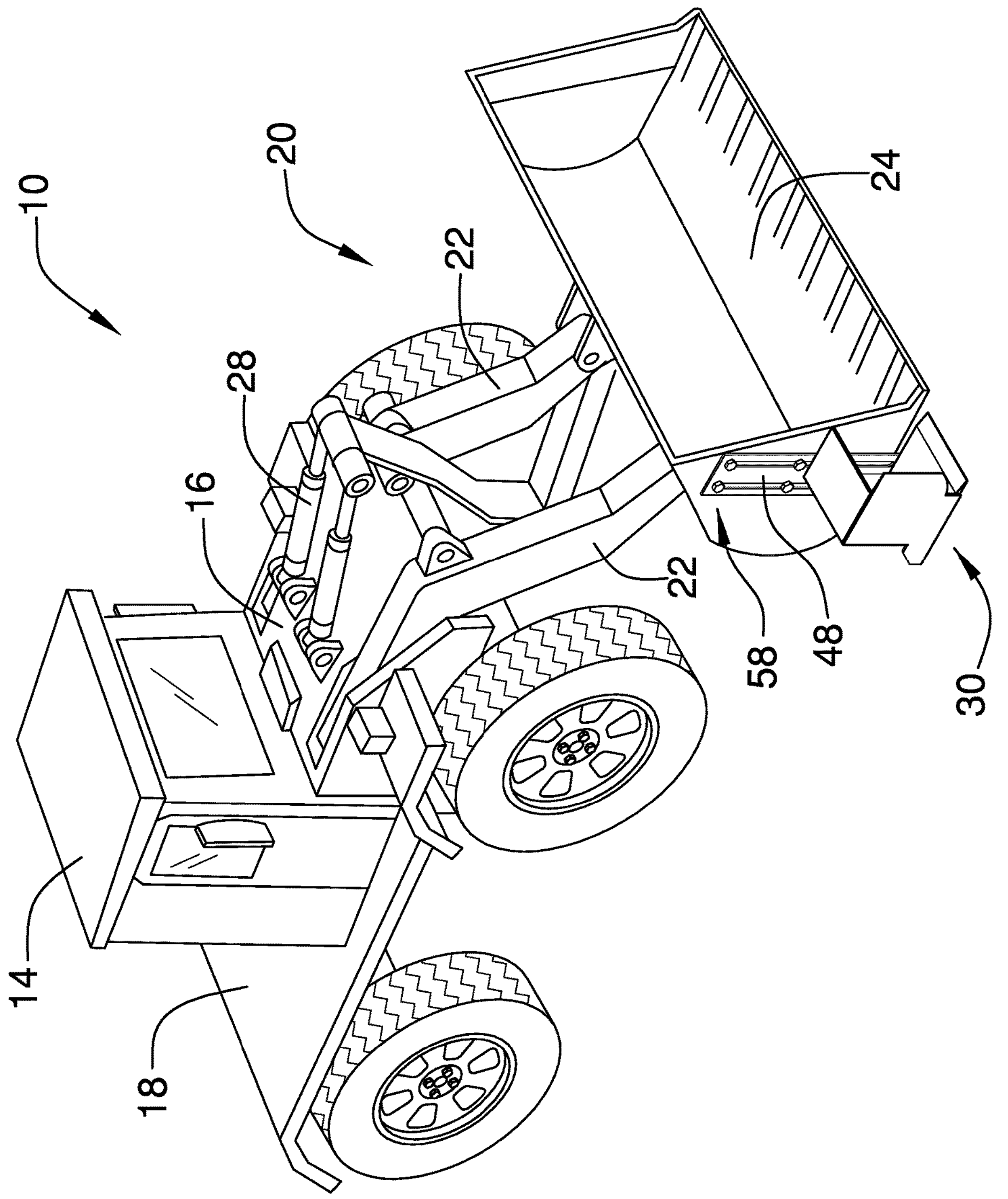
FIG. 8 is an in-use view of an embodiment of the disclosure.
Figure 9:
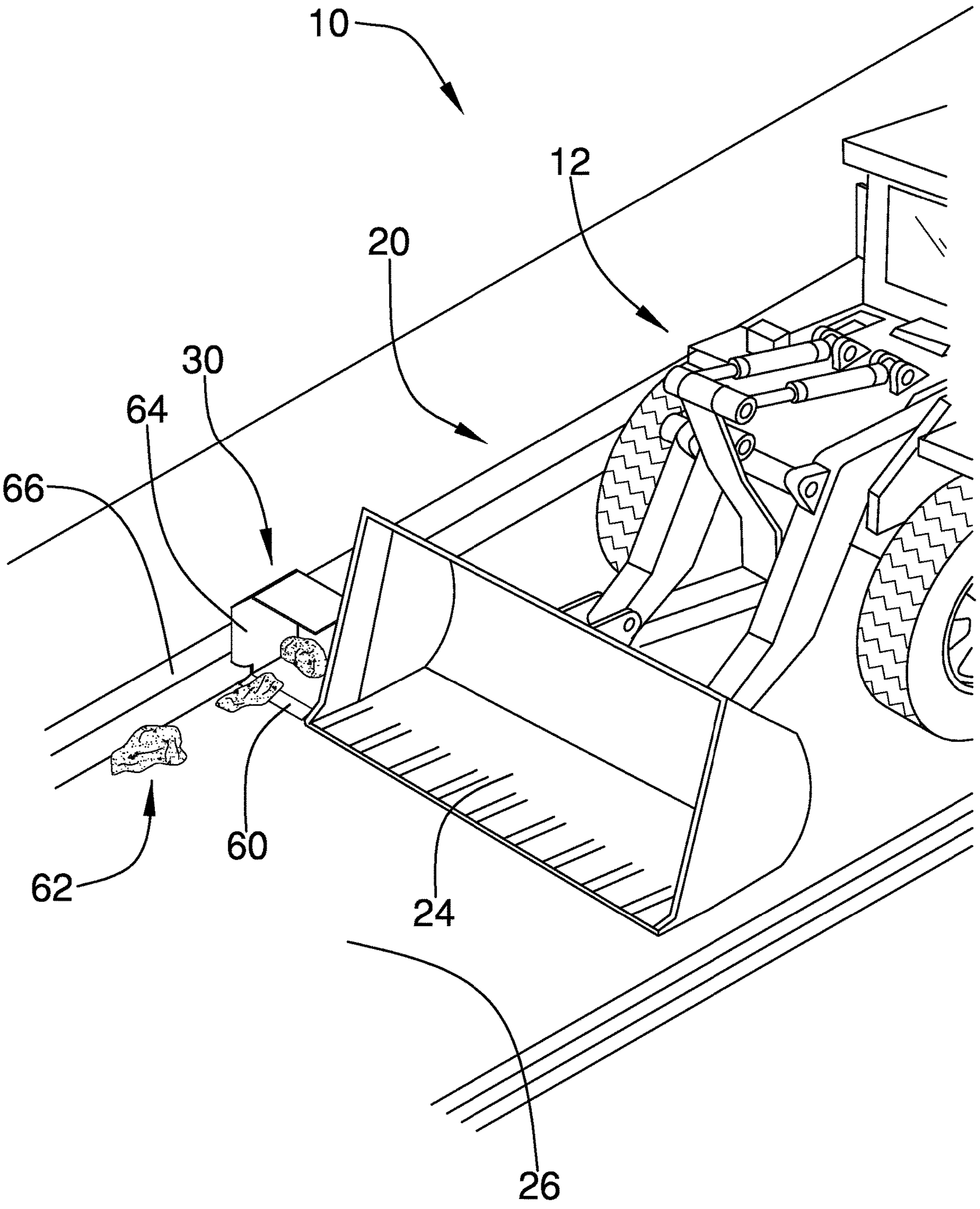
FIG. 9 is an in-use view of an embodiment of the disclosure.

With reference now to the drawings, and in particular to FIGS. 1 through 9 thereof, a new trash collector embodying the principles and concepts of an embodiment of the disclosure and generally designated by the reference numeral 10 will be described.

As best illustrated in FIGS. 1 through 9, the street curb cleaning system 10 generally comprises a tractor 12 including a frame 14. The frame 14 has a front end 16 and a back end 18. A loader 20 is mechanically coupled to the frame 14. The loader 20 includes a pair of boom arms 22 being pivotally coupled to the front end 16 of the frame 14. A bucket 24 is attached to an end of the boom arms 22. The boom arms 22 are actuated to move the bucket 24 down into a lower position, wherein the lower position is defined by the bucket 24 being adjacent to a street surface 26. The loader 20 may include a hydraulic cylinder 28 attached to the bucket 24, wherein the hydraulic cylinder 28 is actuated to pivot the bucket 24 about the end of the boom arms 22. Alternatively, the street curb cleaning system 10 may comprise a commercial vehicle such as a street sweeper vehicle.

A housing 30 encloses a chamber space 32. The housing 30 includes a bottom wall 34, a back wall 36, a side wall 38, and a top wall 40. The bottom wall 34, the side wall 38, and the top wall 40 form a front edge 42 of the housing 30, wherein the front edge 42 defines an opening 44 into the chamber space 32. The housing 30 has a rectangular configuration, wherein the top wall 40 and the bottom wall 34 are parallel to each other, and the side wall 38 and the back wall 36 are perpendicular to the top 40 and bottom 34 walls. The bottom wall 34 extends rearwardly beyond the back wall 36 of the housing 30 to define a rear wall 46. The rear wall 46 may stabilize the housing 30 in an upright position when the bucket 24 of the loader 20 is positioned in the lower position, wherein the bottom wall 34 and the rear wall 46 are positioned adjacent to the street surface 26.

A mount 48 is coupled to the housing 30. The mount 48 removably mounts the housing 30 to the tractor 12. The mount 48 comprises a panel 50 attached to the bottom wall 34 and the panel 50 extends upwardly from the bottom wall 34. The panel 50 has a first surface 52 and a second surface 54 being parallel to each other. The front surface is abuttable to a side of the bucket 24 of the loader 20 and the second surface 54 is positioned facing the side wall 38 of the housing 30. The first surface 52 has a pair of slots 56 extending therethrough and through the second surface 54. Each of the slots 56 are elongated from an upper end of the panel 50 to a lower end of the panel 50. One of the slots 56 is positioned outside of the housing 30 and the other slot is partially aligned laterally with the chamber space 32. Each of the slots 56 are configured for receiving a respective one of a plurality of bolts 58 through.

A bottom wedge 60 extends outwardly from a bottom section of the front edge 42. The bottom wedge 60 is configured to separate trash 62 from the street surface 26 when the tractor 12 moves the bottom wedge 60 forward adjacently to the street surface 26, wherein the bottom wedge 60 is configured to ramp trash 62 up through the opening 44 into the chamber space 32. A side wedge 64 extends outwardly from a side section of the front edge 42. The side wedge 64 is positioned perpendicular to the bottom wedge 60 and is configured to separate trash 62 from a curb surface 66 when the tractor 12 moves the side wedge 64 forward adjacently to the curb surface 66. The curb surface 66 is positioned at a lateral edge of the street surface 26 and is typically positioned perpendicular relative to the street surface 26.

In use, the mount 48 attaches the housing 30 to the bucket 24 of the loader 20 of the tractor 12. The boom arms 22 lower the bucket 24 into the lower position and the tractor 12 moves in a forward direction along the street surface 26. The bottom wedge 60 of the housing 30 separates the trash 62 from the street surface 26 and collects the trash 62 through the opening 44 into the chamber space 32 as the tractor 12 moves forward. The tractor 12 positions the bucket 24 of the loader 20 proximate to the curb surface 66, wherein the side wall 38 of the housing 30 is positioned adjacent to the curb surface 66 such that the side wedge 64 separates trash 62 from the curb surface 66 as the tractor 12 moves forward.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A street curb cleaning system comprising:

a tractor, wherein said tractor includes a frame, said frame having a front end and a back end;

a housing enclosing a chamber space, said housing including a bottom wall, a back wall, a side wall, and a top wall, said bottom wall, said side wall, and said top wall forming a front edge of said housing, wherein said front edge defines an opening into said chamber space;

a mount being coupled to said housing, said mount removably mounting said housing to said tractor;

a bottom wedge extending outwardly from a bottom section of said front edge, said bottom wedge being configured to separate trash from a street surface when said tractor moves said bottom wedge forward adjacently to the street surface, wherein said bottom wedge is configured to ramp trash up through said opening into said chamber space;

a side wedge extending outwardly from a side section of said front edge, said side wedge being configured to separate trash from a curb surface when said tractor moves said side wedge forward adjacently to the curb surface;

a loader being mechanically coupled to said frame, said loader including a pair of boom arms being pivotally coupled to said front end of said frame, a bucket being attached to an end of said boom arms; and wherein said mount comprises a panel attached to said bottom wall, said panel extending upwardly from said bottom wall, said panel having a first surface and a second surface, said front first surface being abuttable to a side of said bucket of said loader, said second surface being positioned facing said side wall of said housing, said first surface having a pair of slots extending therethrough and through said second surface, each of said slots being elongated from an upper end of said panel to a lower end of said panel, one of said slots being positioned outside of said housing and the other slot being partially aligned laterally with said chamber space, each of said slots being configured for receiving a respective one of a plurality of bolts through.

2. A street curb cleaning system of claim 1, wherein said housing has a rectangular configuration.

3. A street curb cleaning system comprising:

a tractor, said tractor including:

a frame, said frame having a front end and a back end; and a loader being mechanically coupled to said frame, said loader including:

a pair of boom arms being pivotally coupled to said front end of said frame; and a bucket being attached to an end of said boom arms;

a housing enclosing a chamber space, said housing including a bottom wall, a back wall, a side wall, and a top wall, said bottom wall, said side wall, and said top wall forming a front edge of said housing, wherein said front edge defines an opening into said chamber space, said housing having a rectangular configuration, said bottom wall extending rearwardly beyond said back wall of said housing;

a mount being coupled to said housing, said mount removably mounting said housing to said tractor, said mount comprising a panel attached to said bottom wall, said panel extending upwardly from said bottom wall, said panel having a first surface and a second surface, said first surface being abuttable to a side of said bucket of said loader, said second surface being positioned facing said side wall of said housing, said first surface having a pair of slots extending therethrough and through said second surface, each of said slots being elongated from an upper end of said panel to a lower end of said panel, one of said slots being positioned outside of said housing and the other slot being partially aligned laterally with said chamber space, each of said slots being configured for receiving a respective one of a plurality of bolts through;

a bottom wedge extending outwardly from a bottom section of said front edge, said bottom wedge being configured to separate trash from a street surface when said tractor moves said bottom wedge forward adjacently to the street surface, wherein said bottom wedge is configured to ramp trash up through said opening into said chamber space; and a side wedge extending outwardly from a side section of said front edge, said side wedge being configured to separate trash from a curb surface when said tractor moves said side wedge forward adjacently to the curb surface.

* * * * *